UNITED STATES PATENT OFFICE.

HENRY W. HOLLY, OF BROOKLYN, ASSIGNOR TO ALBERT H. JOCELYN, OF YONKERS, NEW YORK.

IMPROVEMENT IN COMPOSITIONS FOR ARTIFICIAL SLATES.

Specification forming part of Letters Patent No. 153,195, dated July 21, 1874; application filed December 27, 1873.

*To all whom it may concern:*

Be it known that I, HENRY W. HOLLY, of Brooklyn, in the county of Kings and State of New York, have invented a certain Compound for Facing Blackboards or Artificial Slates, of which the following is a specification:

The object of this invention is to produce a cheap, simple, and efficacious compound for facing blackboards or artificial slates, that will not require to be applied by an expert, but may be used by any person, whereby teachers of schools and academies may repair their blackboards themselves, and so be saved the trouble and expense of summoning an expert for the business.

The compound that I have invented may be applied like paint, and, owing to the absence of naphtha or analogous material from its ingredients, it will dry gradually, and therefore may be laid on smoothly without difficulty.

The compound is prepared as follows: A quantity of gum-copal is heated to about 900° Fahrenheit, to rid it of oil, which interferes with its drying properties. Black oxide of manganese, litharge, and oxide of zinc are added to it to increase the drying property and afford the compound the necessary binding quality. Linseed-oil, heated to about 400° Fahrenheit, to expel from it all watery matter, is added to afford the water-proof property and elasticity. Pumice-stone or charcoal is used to form the gritty or triturative property necessary to enable boards faced with this compound to be marked on easily. The requisite blackness is imparted to the compound by lamp-black, bone-black, or any other suitable pigment. Spirits of turpentine serves as the menstruum.

The proportions in which the ingredients are mixed are as follows: Gum-copal, (melted as above,) by weight, three parts; black oxide of manganese, by weight, one-half part; litharge, by weight, one-half part; oxide of zinc, by weight, two parts; linseed-oil, (after heating,) by weight, one and one-half part; pumice-stone, five parts, or charcoal, two parts; spirits of turpentine, by weight, three and one-half parts.

The proportions of litharge and the oxide of manganese and zinc will be varied according to the state of the weather at the time the composition is applied. Less quantities of these ingredients will be needed in a dry atmosphere than in a moist one.

This compound is cheap, simple, and very efficient for the purpose for which it is designed. Owing to the absence of any very volatile ingredient in it, the compound, while it will dry quickly enough for all practical purposes, will yet be long enough in doing so to to render it an easy matter to lay it evenly on the board or other surface which it is desirable to face with it.

No expert need be employed to apply it to the board, for, as previously stated, it is used like paint, and may be put on by the teacher of the school to which the board belongs, or by any other person, and, although it does not dry very rapidly, it dries quickly enough to allow of its being put on between the school-session of one day and that of the day succeeding.

What I claim as my invention is—

The compound for facing blackboards or artificial slates composed of the ingredients hereinbefore named, substantially as set forth.

HENRY W. HOLLY.

Witnesses:
MICHAEL RYAN,
FRED. HAYNES.